United States Patent
Zhang et al.

(10) Patent No.: US 10,691,712 B2
(45) Date of Patent: Jun. 23, 2020

(54) SYSTEM AND METHOD FOR MERGING A MAINFRAME DATA FILE TO A DATABASE TABLE FOR USE BY A MAINFRAME REHOSTING PLATFORM

(71) Applicant: Oracle International Corporation, Redwood Shores, CA (US)

(72) Inventors: Weixuan (Wade) Zhang, Beijing (CN); Weiguo Zhu, Beijing (CN); Hui Shen, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 318 days.

(21) Appl. No.: 15/386,399

(22) Filed: Dec. 21, 2016

(65) Prior Publication Data
US 2017/0206208 A1    Jul. 20, 2017

Related U.S. Application Data

(60) Provisional application No. 62/280,813, filed on Jan. 20, 2016.

(51) Int. Cl.
*G06F 16/25*    (2019.01)

(52) U.S. Cl.
CPC .................. *G06F 16/25* (2019.01)

(58) Field of Classification Search
CPC ......... G06F 17/30297; G06F 17/30557; G06F 16/2014; G06F 16/2282; G06F 16/258; G06F 16/25
See application file for complete search history.

(56) References Cited

U.S. PATENT DOCUMENTS

| | | | | |
|---|---|---|---|---|
| 5,678,044 A | * | 10/1997 | Pastilha | ............. G06F 8/37 |
| 6,006,277 A | * | 12/1999 | Talati | ............. G06F 9/54 703/27 |
| 8,010,582 B2 | * | 8/2011 | Zimowski | ............. G06F 17/303 707/803 |
| 8,037,008 B2 | | 10/2011 | Jung | |

(Continued)

OTHER PUBLICATIONS

Eadon, et al., "Supporting Table Partitioning by Reference in Oracle", 2008, ACM. (Year: 2008).*

(Continued)

*Primary Examiner* — Apu M Mofiz
*Assistant Examiner* — Sheryl L Holland
(74) *Attorney, Agent, or Firm* — Tucker Ellis LLP

(57) ABSTRACT

In accordance with an embodiment, described herein is a system and method for merging a mainframe data file to a target table in a database used by a mainframe rehosting platform. A plurality of programs can be generated by the mainframe rehosting platform based on the target table and the mainframe data file. The generated programs can be used to create in the database an empty temporary table that has the same structure as that of the target table, to upload the mainframe data file to the empty temporary table, and to use an existing merge function in the database to merge the temporary table with the target table. When uploading the mainframe data file to the temporary table, records in the mainframe data file can be read and stored into an array, which can be inserted into the temporary table in a single insert operation.

17 Claims, 4 Drawing Sheets

(56) References Cited

U.S. PATENT DOCUMENTS

| | | |
|---|---|---|
| 8,539,488 B1 | 9/2013 | Havemose |
| 8,745,076 B2 | 6/2014 | Pazdziora |
| 8,881,139 B1 | 11/2014 | Acacio |
| 9,043,764 B2 | 5/2015 | Ranganathan |
| 9,934,258 B2 | 4/2018 | Fuglsang |
| 2005/0049996 A1* | 3/2005 | Srinivasan ............... G06F 16/83 |
| 2007/0067771 A1 | 3/2007 | Kulbak et al. |
| 2010/0262970 A1 | 10/2010 | Havemose |
| 2012/0159427 A1* | 6/2012 | Oara ........................ G06F 8/10 717/104 |
| 2012/0265726 A1* | 10/2012 | Padmanabhan ....... G06F 17/303 707/602 |
| 2012/0324434 A1 | 12/2012 | Tewari et al. |
| 2014/0068269 A1 | 3/2014 | Zhou |

OTHER PUBLICATIONS

"Oracle Tuxedo Application Runtime for Batch—Reference Guide", Sep. 2013, Oracle. (Year: 2013).*

Kepner et al., "Achieving 100,000,000 database inserts per second using Accumulo and D4M", 2014, IEEE. (Year: 2014).*

Bruni et al., "DB2 Data Management Software—Moving Data Across the DB2 Family", 2003, IBM. (Year: 2003).*

G. Graefe, "Sort-Merge-Join: An Idea Whose Time Has(h) Passed?", 1994, IEEE. (Year: 1994).*

United States Patent and Trademark Office, Office Action dated Nov. 19, 2018 for U.S. Appl. No. 15/386,392, 11 Pages.

Oracle, "Oracle Tuxedo Application Rehosting Workbench" Reference Guide 12c Release 2(12.1.3), Apr. 2014, Copyright © 2012, 2014, 500 pages.

United States Patent and Trademark Office, Office Action dated Aug. 1, 2019 for U.S. Appl. No. 15/386,405, 28 Pages.

United States Patent and Trademark Office, Office Action dated Sep. 18, 2018 for U.S. Appl. No. 15/386,410, 12 Pages.

Mark Rakhmilevich, Oracle® Mainframe Rehosting Leveraging Oracle Tuxedo: Accelerating Cost Reduction and Application Moderationization, Jun. 2008, Updated Mar. 2009, 37 pages.

* cited by examiner

SYSTEM AND METHOD FOR MERGING A MAINFRAME DATA FILE TO A DATABASE TABLE FOR USE BY A MAINFRAME REHOSTING PLATFORM

CLAIM OF PRIORITY

This application claims the benefit of priority to U.S. Provisional Application titled "SYSTEM AND METHOD FOR MERGING DATA IN A FILE FORMAT TO A RELATIONAL DATABASE TABLE IN A TRANSACTIONAL PROCESSING ENVIRONMENT", application Ser. No. 62/280,813, filed Jan. 20, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and application rehosting, and are particularly related to a system and method for merging a mainframe data file to a database table for use by a mainframe rehosting platform.

BACKGROUND

To reduce costs and become as agile as possible, organizations today are increasingly seeking to move business-critical mainframe applications to open systems and cloud environments. However, to do so can imply complex, costly and resource-heavy application migration projects, which deter companies from undertaking such migrations. Over the years, mainframe application rehosting has become a preferred option for many organizations for modernizing their mainframe legacy systems. This is the general context in which embodiments of the inventions are described.

SUMMARY

In accordance with an embodiment, described herein is a system and method for merging a mainframe data file to a target table in a database used by a mainframe rehosting platform. A plurality of programs can be generated by the mainframe rehosting platform based on the target table and the mainframe data file. The generated programs can be used to create in the database an empty temporary table that has the same structure as that of the target table, to upload the mainframe data file to the empty temporary table, and to use an existing merge function in the database to merge the temporary table with the target table. When uploading the mainframe data file to the temporary table, records in the mainframe data file can be read and stored into an array, which can be inserted into the temporary table in a single insert operation.

DETAILED DESCRIPTION

As companies face increasing pressure to deliver more business value from their IT spending and free up funding for new business initiatives, more and more companies are migrating their mainframe applications to open systems, such as Oracle Tuxedo Application Runtimes (ART), to reduce mainframe costs and modernize to legacy applications. Mainframe rehosting platforms, such as Oracle Tuxedo Application Runtimes (ART), can be used to simplify the migration.

Mainframe Rehosting Platform

Figure 1:
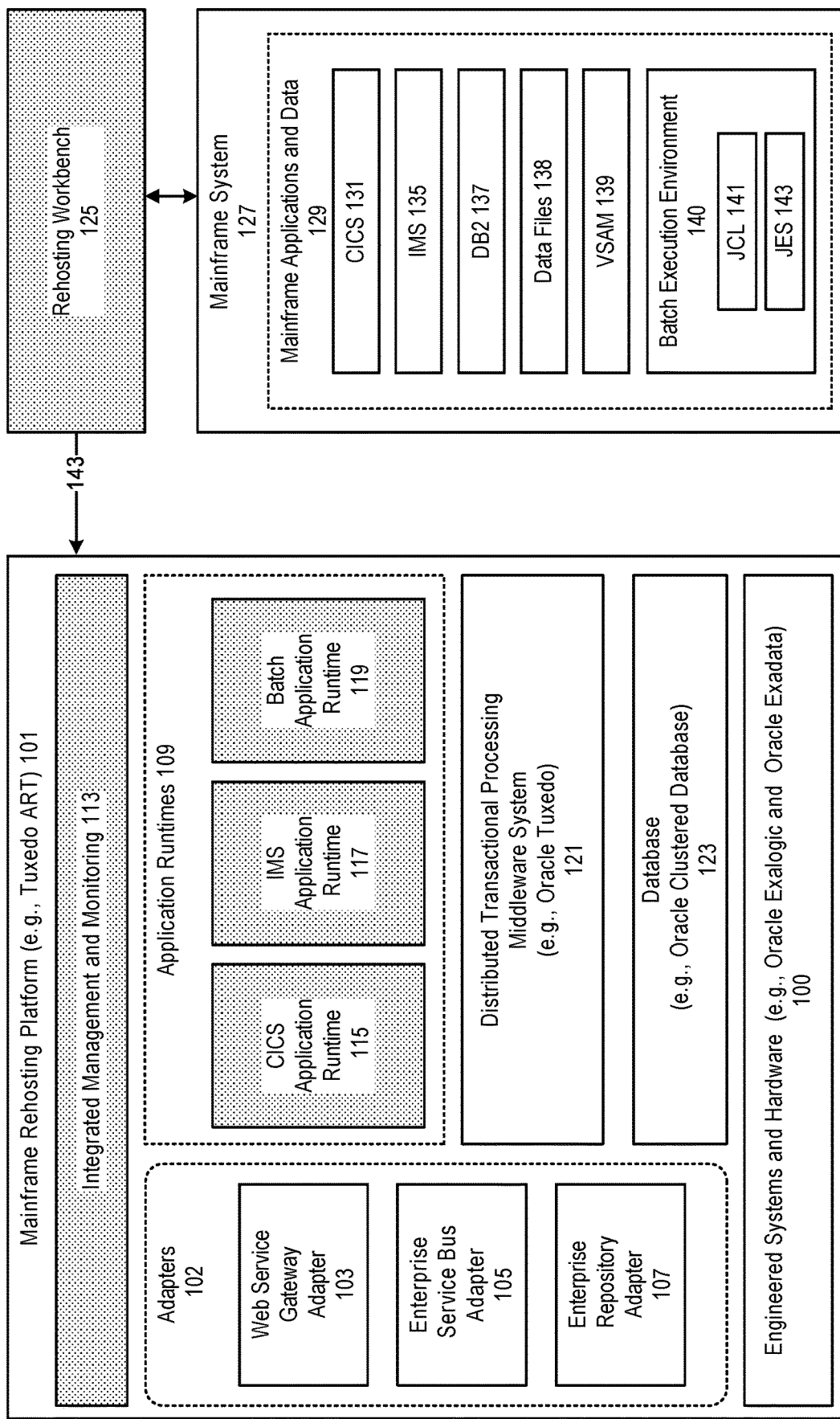
FIG. 1 illustrates an exemplary mainframe rehosting platform, in accordance with an embodiment.

FIG. 1 illustrates an exemplary mainframe rehosting platform, in accordance with an embodiment.

As shown in FIG. 1, a mainframe rehosting platform 101 and a rehosting workbench 125 can provide a system for rehosting mainframe applications and data 129 on lower-cost platforms without losing business value or sacrificing Quality of Service (QoS).

In accordance with an embodiment, the mainframe applications and data 129 to be rehosted can currently run on a mainframe system 127, for example, an IBM@ mainframe system; and can include a customer information control system (CICS) 131, an information management system (IMS) 135, a DB2 database 137, one or more data files (e.g., sequential files) 138, and a virtual storage access method (VSAM) file management system 139.

In accordance with an embodiment, the CICS and the IMS can be middleware products on the mainframe system. The CICS is a heavy and rigid transaction processing management system designed to support rapid, high-volume online transaction processing. The IMS is a light-weight message-based transaction processing management system. The middleware products can be used to host business logic written in COBOL, PL/I, C, Assembly or 4GLs. The VSAM can comprise different file organizations which can be used by application programs to manage their data. The file organizations can include key sequenced data set key (KSDS), relative record data set (RRDS), entry sequenced data set (ESDS), and linear data set (LDS).

In addition, the mainframe system 127 can include a batch execution environment 140 that can support JOB Control Language (JCL) 141 and a job entry subsystem (JES) 143. JCL can be a script language to implement batch processes on the mainframe system. JES can be a major component of an operating system on the mainframe system, can receive jobs into the mainframe system, schedule the jobs for processing, and control their output processing.

As further shown in FIG. 1, the mainframe rehosting platform can include a software stack compatible with the mainframe system to run mainframe applications with little to no change to minimize the risks and cost of migration; and an integrated management and monitoring component 113 for use in monitoring the mainframe rehosting platform. The software stack can provide a set of mainframe-compatible functionalities to preserve CICS, IMS, and batch application logic and data.

In accordance with an embodiment, the software stack can include a plurality of application runtimes (ART) 109 for hosting mainframe applications, for example, a CICS application runtime 115, an IMS application runtime 117, and a batch application runtime 119. The plurality of application runtimes and a rehosting workbench 125 can be used to migrate 143 the mainframe applications 129 from the mainframe system 127 to the mainframe rehosting platform 101.

In accordance with an embodiment, the CICS application runtime can include a set of Tuxedo servers to simulate core features of the mainframe CICS. The Tuxedo system servers can provide underlying application server functions, including cluster management, request routing, health monitoring, restarts, failover, load balancing, transaction management, communication channels and gateways (ATMI, CICS, IMS, SOAP/HTTP web services, Java/JCA, .Net, ESB), and protocol conversion.

In accordance with an embodiment, the IMS application runtime can provide a set of DL/I calls for use by COBOL/C applications migrated from the mainframe system 127; a robust session environment to handle concurrent connections from a plurality of 3270 terminals; a robust execution environment to provide OLTP to process transaction codes received from the 3270 terminals via calling the migrated COBOL/C applications; and a DB plug-in on the mainframe rehosting platform.

In accordance with an embodiment, the batch application runtime 119 can include a set of Tuxedo servers to simulate mainframe JES core features. For example, the batch application runtime can provide batch management and a plurality of JES functions (e.g., job queues, classes, priorities, and initiators).

In accordance with an embodiment, the rehosting workbench can be used to automate code and data migration using migration tools in the rehosting workbench. The code and data can include COBOL programs, copybooks, BMS screens, JCL, and DB2 DDL. The code and data can be transferred from the mainframe system 127 to the rehosting workbench, which can parse source objects, calculate dependencies, generate metadata, and produce reports to indicate any missing objects or unused ones in the code and data.

In accordance with an embodiment, after the code and data are parsed, data migration tools for files and DB2 tables can run, followed by code migration tools for COBOL JCL. The code migration tools can apply sophisticated language processing to adapt COBOL code between compiler dialects, transform JCL, adapt SQL calls for differences between DB2 and Oracle DB. For data migration, the data migration tools can generate target schemas, including Oracle DDL, in the mainframe rehosting platform 101, and can automate data reloading to the generated target schemas.

In accordance with an embodiment, the rehosting workbench can be used in UNIX command line mode, and an Eclipse IDE graphical environment; and can generate system configuration files for the mainframe rehosting platform to facilitate configuration management and to simplify the deployment process.

The software stack can execute on a distributed transactional processing middleware system 121, for example, Oracle Tuxedo. The distributed transactional processing middleware system can run on an open system environment, for example, UNIX, Linux, or Windows. The distributed transactional processing middleware system can include a native distributed architecture to provide transaction manager features for IMS and CICS from the perspective of applications.

In accordance with an embodiment, the distributed transactional processing middleware system can represent a transaction-oriented middleware, or an enterprise application server designed for high availability and to provide scalable applications to support transactions on various distributed systems.

Examples of the distributed transactional processing middleware system can include Tuxedo (Transactions for UNIX, Enhanced for Distributed Operation), a message-based communications system to distribute applications across various operating system platforms and databases.

Tuxedo allows messages to be queued to persistent or non-persistent storage (memory) for later processing or retrieval. An application-to-transaction monitor interface (ATMI) in Tuxedo can provide an interface that allows messages to be added to or read from queues. Tuxedo can pass service request messages between ATMI clients and servers through operating system (OS) inter-processes. In Tuxedo, requests are sent to named services, and Tuxedo uses memory based inter-process communication facilities to queue the requests to servers.

Rehosted mainframe applications can run as Tuxedo services, and can take advantage of SOA integration and enablement capabilities via a plurality of adapters 102, for example, a web service gateway adapter 103, an enterprise service bus (ESB) adapter 105, and an enterprise repository adapter 107.

In accordance with an embodiment, rehosted/migrated applications can be configured to expose a plurality of service interfaces in legacy components via standard WSDLs, and to provide robust bi-directional web services gateway capabilities. For example, the web service gateway adapter 103, an example of which can be Oracle Service Architecture Leveraging Tuxedo (SALT) adapter, can enable the rehosted applications to participate in SOA environments.

In addition, the rehosted applications can also use the ESB adapter 105 with built-in Tuxedo Transport for heterogeneous messaging. Web services and ESB end points can be imported into an enterprise repository via the enterprise repository adapter 107 to provide visibility, service dependency tracking, and other benefits of service lifecycle governance.

As further shown in FIG. 1, in accordance with an embodiment, the distributed transactional processing middleware system can execute on an engineered system and hardware 100, such as Oracle Exalogic and Oracle Exadata; and can include a clustered database 123, such as Oracle REAL Application Clusters. The clustered database can support usage of multiple individual systems as one clustered, virtual database server; and can provide transparent synchronization of read and write accesses to databases shared by all nodes in a cluster, dynamic distribution of database workload, and transparent protection against systems failures.

In accordance with an embodiment, the system described above, by combining a distributed transactional processing middleware system, a clustered database, an engineered system, and a plurality of open system products, can provide required reliability, availability, scalability and performance to rehosted mainframe applications.

Merging a Data File to a Database Table

In a mainframe system, it may happen some data is a stored in a database table, for example, a DB2 on a mainframe system; and some other data is stored in datasets or files on the mainframe system. The structure of the database table can be logically consistent with that of the datasets or files.

The data in the database table and the data in the datasets or files may need to be migrated to a database, for example, Oracle DB, for rehosting by a mainframe rehosting platform.

To rehost the data in the database, for example, DB2, the data can be first unloaded into one or more sequential files, and can subsequently be downloaded to a UNIX system, where the one or more sequential files can be converted by a conversion program generated by a rehosting workbench, before the data is reloaded into the database (e.g., Oracle DB) associated with the mainframe rehosting platform.

To rehost the data in the datasets or files, the data can be unloaded into one or more sequential files if the data is not already in a sequential format, and can sequentially downloaded to a UNIX system, where the one or more sequential files can be converted by a conversion program generated by a rehosting workbench, before the data is reloaded into the database associated with the mainframe rehosting platform.

Under an existing approach, when reloading the sequential files to a database table (e.g., an Oracle table), a file (e.g., a ksds rdb file) that represents the database table can be downloaded by a rehosting workbench to a temporary file, which can be merged with the sequential files to create a merged file. The merged file can be uploaded to the database table.

The above-described approach can have numerous performance bottlenecks. For example, the performance of merging a data file to a relational database table can be poor because each record in the input data file needs to be inserted or updated to the table one by one. When duplicate keys exist between the data file and the table, the performance can be worse. Another performance bottleneck is the time-consuming communication between an uploading application (or a merging application) and the database table.

In accordance with an embodiment, the system and method described herein can be used to address the performance bottlenecks described above in merging a mainframe data file to a target table in a database.

In accordance with an embodiment, a plurality of programs can be generated by the mainframe rehosting platform based on the target table and the mainframe data file. The generated programs can be used to create in the database an empty temporary table that has the same structure as that of the target table, to upload the mainframe data file to the empty temporary table, and to use an existing merge function in the database to merge the temporary table with the target table. When uploading the mainframe data file to the temporary table, records in the mainframe data file can be read and stored into an array, which can be inserted into the temporary table in a single insert operation.

Although embodiments described herein are directed to only one source data file and one target table, the systems and methods described in this document can be used when merging multiple files to multiple tables.

In accordance with an embodiment, the data file can be a sequential UNIX file from a mainframe system, or another type of data file. The target table can be a table in an Oracle database, DB2, MySQL, or another relational database.

In accordance with an embodiment, as the system and method described above uses an array access approach to upload a data file to a temporary table, the performance bottleneck in communication between an uploading (and/or inserting program) and a relational database can be reduced or eliminated, especially when processing large volume of records.

Further, as the merging between the temporary table and a target table in the relational database is performed by an existing embedded merge function inside a relational database, the merging can be very fast, thereby reducing or eliminating the performance bottleneck in merging experienced in an existing approach.

Figure 2:
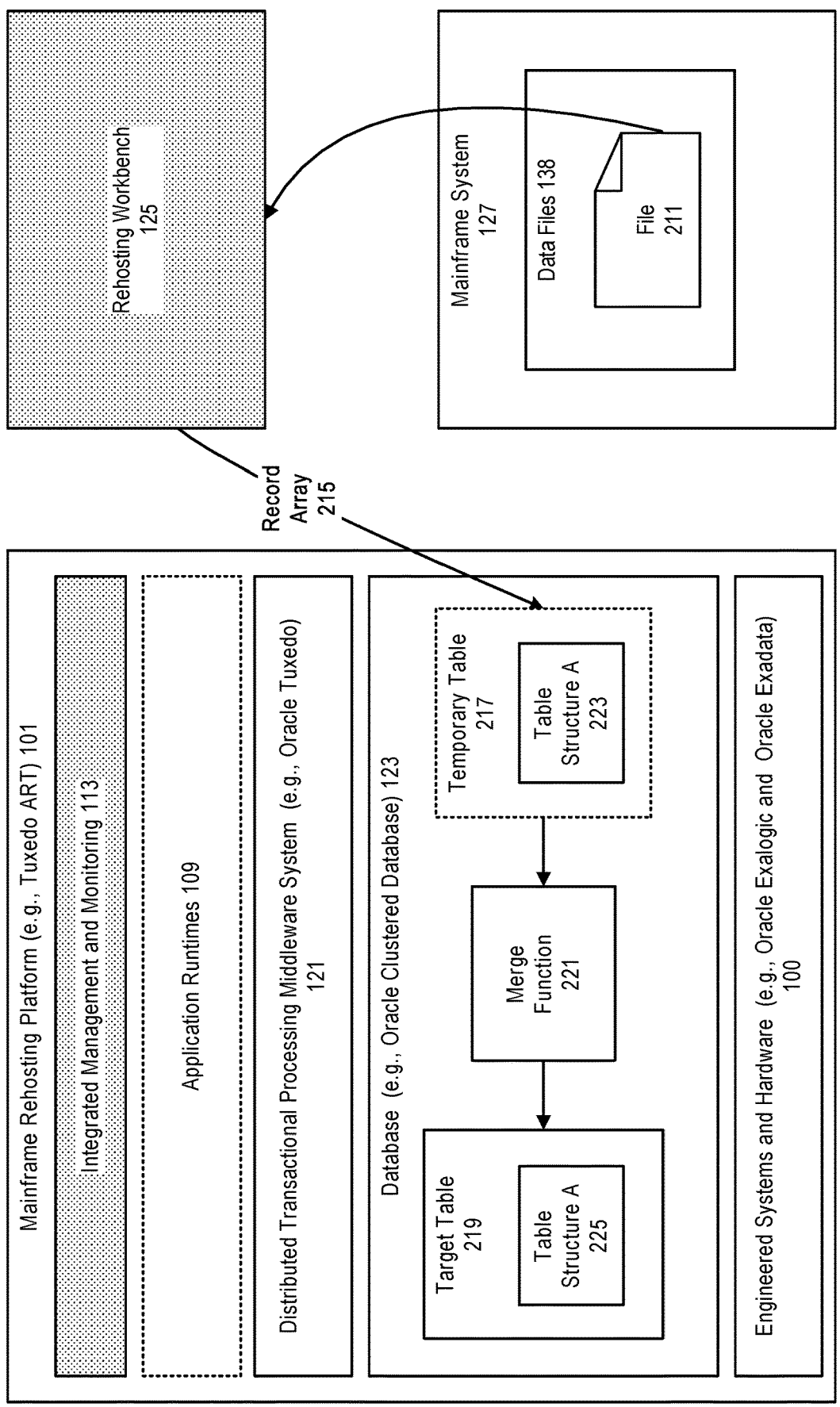
FIG. 2 illustrates a system for merging a mainframe data file to a target table in a database used by a mainframe rehosting platform, in accordance with an embodiment.

FIG. 2 illustrates a system for merging a mainframe data file to a target table in a database used by a mainframe rehosting platform, in accordance with an embodiment.

As shown in FIG. 2, the system can include the rehosting workbench 125, a temporary table 217, and a target table 219 in the database 123, and a merge function 221 in the database.

In accordance with an embodiment, the target table and the temporary table can include the same table structure A 223, 225, for example, the same table schema.

In accordance with an embodiment, the merge function can be an embedded function that is part of the database.

For example, in an Oracle relational database, the merge function can be a MERGE statement for performing an if-then logic, under which a new record can be inserted when a condition is met, or an existing record can be updated when the condition is not met. The MERGE statement allows the insert or update to be performed in a single SQL statement.

In accordance with an embodiment, the MERGE statement can be used to select rows from one or more source files for update or insertion into a table or view. Conditions can be specified to determine whether to update or insert into the target table or view. The MERGE statement can be used to combine multiple operations to avoid multiple INSERT, UPDATE, and DELETE DML statements; and to perform an "upsert" operation (i.e. update existing rows in a table or insert new rows depending on a match condition).

As further shown in FIG. 2, the rehosting workbench 125 can create the temporary table based on a mainframe file 211 and the target table, and upload and insert an array of records 215 in a single INSERT operation or in one set of I/O calls.

After all the records in the mainframe file has been inserted into the temporary table, the rehosting workbench can invoke the merge function 211 via a command to merge the temporary table to the target table.

Figure 3:
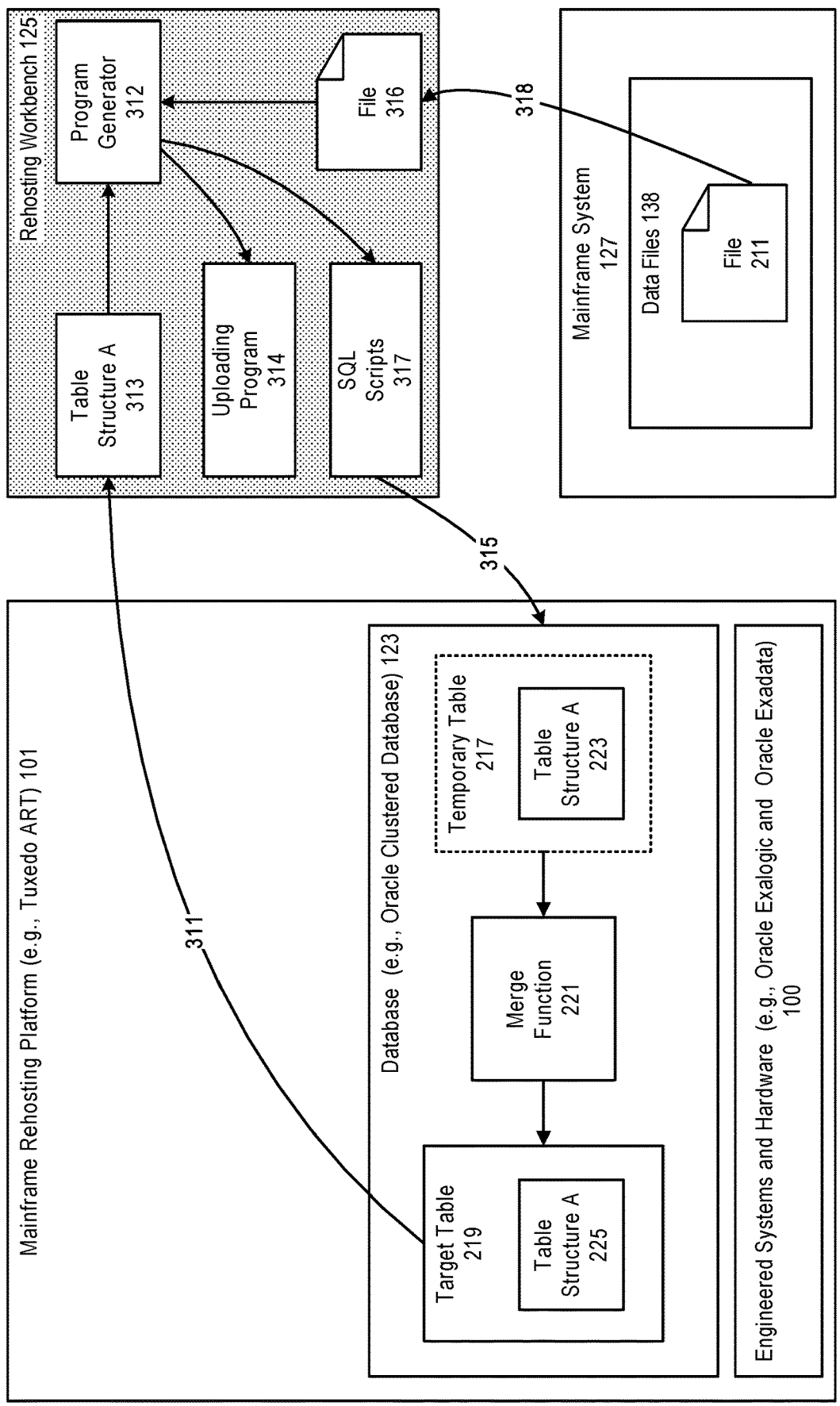
FIG. 3 further illustrates a system for merging a mainframe data file to a target table in a database used by a mainframe rehosting platform, in accordance with an embodiment.

FIG. 3 further illustrates a system for merging a mainframe data file to a target table in a database used by a mainframe rehosting platform, in accordance with an embodiment.

More particularly, FIG. 2 illustrates that a program generator 312 in the rehosting workbench can be used to generate an uploading program 314, a plurality of SQL scripts 317, based on a data file 316 retrieved 318 from the mainframe system 127 and a table structure (e.g., Table Structure A 313) downloaded 311 from the mainframe rehosting system.

In accordance with an embodiment, the uploading program can be a COBOL program used to insert an array of records into the temporary table. The plurality of SQL scripts can be used to create the temporary table, and merge the temporary table with the target table. The SQL scripts generated by the program generator 312 can include two types of scripts: *.cmd" scripts and ".sql" scripts.

Each of the ".cmd" scripts can contain a sequence of "*.sql" scripts, which can be read and executed by the batch application runtime of the mainframe rehosting platform after being invoked at the rehosting workbench. An example list of ".sql" scripts are listed below:

01_Create_Tmp_Table.sql: Used to create a temporary table for the target table (e.g., Schema_A.Table_A) a Main table, and one or more Detail tables.

02_Create_Same_Key_Table.sql: Used to create a same-key table that only contains the KEY columns. The values in the KEY columns can be keys that exist in both the target table and the temporary table for the target table.

03_Err_Check_on_No_Replace.sql: SYSIN for IDCAMS can configure the err limits (i.e. how many record operations can fail). For example, if the err_num is 5, and more than 5 records with the same key are copied, then IDCAMS fails. This script can check the record number inside the "Same Key" table, and take an appropriate action ((exit or continue) based on the record number.

04_Delete_Tmp_Table_on_No_Replace.sql: Used to delete records associated with a key from the temporary table if the key is inside the same-key table.

05_Delete_Rec_with_Same_Key_from_Detail_Table.sql: Used to delete records associated with a key from all detail tables when the key is in the same-key table.

06_Merge.sql: Used to merge the main table and the detail tables.

07_Commit.sql: Used to commit records.

08_Drop_Tmp_Table.sql: Used to drop the temporary table.

09_Drop_Same_Key_Table.sql: used to drop the same-key table.

As shown above, the generated SQL scripts and the uploading program can be used to perform the following steps:

Creating a temporary table: an empty temporary table (TEMP table) with the table structure of a target table is created.

Uploading a data file to the temporary table: all the records from a data file can be uploaded to the temporary table. This step can be performed using different methods to improve performance. For example, instead of uploading the records in the data file one by one, the records can be uploaded in bulk, for example, in a bulk of 10, 20 or 100, so that communication with a relational database can be minimized. As another example, the data file can be logically partitioned into multiple segments, and multiple processes can be used to upload the multiple segments in parallel. Each process can commit once at the end. Since all operations are INSERT operations, there may not be any data consistency issue.

Merging the temporary table to the target table: The merge function provided by a relational database can be used to merge the temporary table to the target table. Based on a user's choice of handling duplicate keys, corresponding options of the merge function can be used. This step can be fast because it is performed on the database server side, and no communication with a client application is needed.

As an illustrative example, given that the DDL for a table is:

```
CREATE TABLE TEST01 (
    KEY0        NUMBER(8) NOT NULL,
    DATA0       CHAR (35),
    DATA1       CHAR (35),
    CONSTRAINT PK_TEST01 PRIMARY KEY (KEY0)
);
```

The following statements can be used to update a record which has the same key with an existing record in the table, and insert the record that has a new key into the table.

```
MERGE INTO TEST01 A USING TEST01_TMP B ON
(A.KEY0 = B. KEY0)
WHEN MATCHED THEN
    UPDATE SET A. DATA0 = B. DATA0, A. DATA1 = B. DATA1
WHEN NOT MATCHED THEN
    INSERT (A.KEY0, A.DATA0, A.DATA1) VALUES
    (B.KEY0, B.DATA0, B. DATA1);
```

Figure 4:
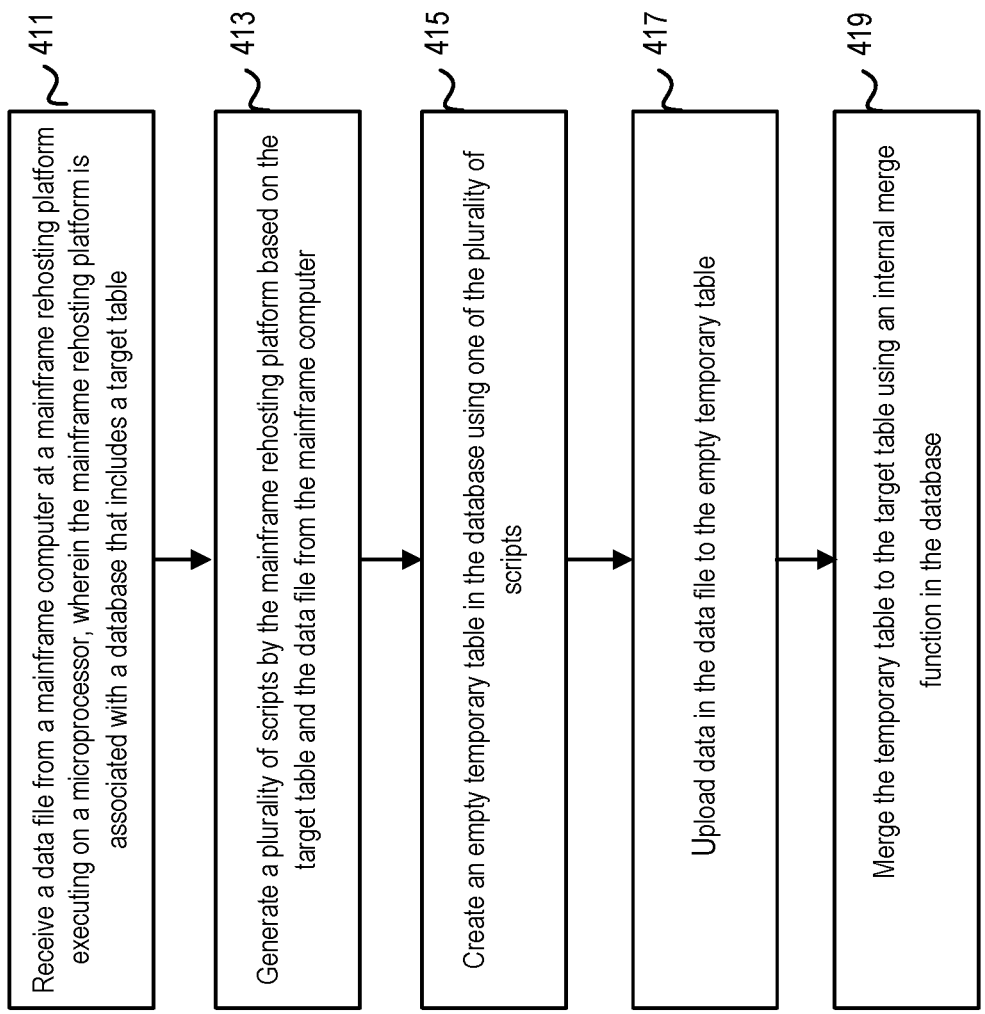
FIG. 4 illustrates a method for merging a mainframe data file to a target table in a database used by a mainframe rehosting platform, in accordance with an embodiment.

FIG. 4 illustrates a method for merging a mainframe data file to a target table in a database used by a mainframe rehosting platform, in accordance with an embodiment.

As shown in FIG. 4, at step 411, a data file from a mainframe computer is received at a mainframe rehosting platform executing on a microprocessor, wherein the mainframe rehosting platform is associated with a database that includes a target table.

At step 413, a plurality of scripts are generated by the mainframe rehosting platform based on the target table and the data file from the mainframe computer.

At step 415, an empty temporary table is created in the database using one of the plurality of scripts.

At step 417, data in the data file is uploaded to the empty temporary table using one of the plurality of scripts.

At step 419, the temporary table is merged to the target table using an internal merge function in the database.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for merging records of a mainframe data file in an associated mainframe computer system into a target database table (TEST01) of a relational database, the system comprising:

a microprocessor;
a mainframe rehosting platform executing on the microprocessor, wherein the mainframe rehosting platform comprises the relational database, wherein the relational database comprises the target database table TEST01, wherein the target database table TEST01 has a target table structure; and
a rehosting workbench generating an uploading program and a plurality of scripts based on the target database table TEST01 and the mainframe data file in the associated mainframe computer system,
wherein the plurality of scripts operate to:
 download the target table structure of the target database table from the mainframe rehosting platform;
 create an empty temporary table (TEST01_TMP) in the relational database, wherein the empty temporary table TEST01_TMP in the relational database has the same target table structure as the target database table TEST01;
 retrieve records of the mainframe data file from the associated mainframe computer system; and
 store the retrieved records of the mainframe data file in a workbench data file of the rehosting workbench in a data array that can be inserted into the empty temporary table TEST01_TMP in an insert operation, and
wherein the uploading program operates to:
 upload the workbench data file to the empty temporary table TEST01_TMP having the same target table structure as the target database table TEST01 by inserting the retrieved records stored in the data array into the empty temporary table TEST01_TMP using the insert operation; and
 merge the records of the mainframe data file into the target database table TEST01 by invoking an existing embedded merge function within the relational database to merge the temporary table TEST01_TMP comprising the inserted retrieved records stored in the data array into the target database table TEST01.

2. The system of claim 1, wherein the uploading program is configured to upload the workbench data file in bulk.

3. The system of claim 1, wherein the uploading program is configured to partition the workbench data file into multiple segments, and invoke a separate process or thread to upload each of the multiple segments to the temporary table TEST01_TMP.

4. The system of claim 1, wherein
the plurality of scripts comprise SQL scripts and common business-oriented language (COBOL) programs;
the relational database is one of an Oracle relational database or DB2; and
the mainframe data file is a UNIX sequential file.

5. The system of claim 1, wherein the plurality of scripts are configured to upload the workbench data file to load the empty temporary table TEST01_TMP by inserting the data array into the temporary table TEST01_TMP in a single insert operation.

6. The system of claim 1, wherein the uploading program is configured to invoke an upsert operation of the internal merge function of the relational database to merge the temporary table TEST01_TMP comprising the data array to the target database table, wherein the upsert operation updates existing rows in the target database table or inserts new rows in the target database table based on a match condition.

7. A method for merging records of a mainframe data file in an associated mainframe computer system into a target database table (TEST01) of a relational database, the method comprising:
executing a mainframe rehosting platform on a microprocessor, wherein the mainframe rehosting platform comprises the relational database, wherein the relational database comprises the target database table TEST01, wherein the target database TEST01 has a target table structure; and
generating by a rehosting workbench an uploading program and a plurality of scripts based on the target database table TEST01 and the mainframe data file in the associated mainframe computer system,
wherein the plurality of scripts operate to:
 download the target table structure of the target database table TEST01 from the mainframe rehosting platform;
 create an empty temporary table (TEST01_TMP) in the relational database, wherein the empty temporary table TEST01_TMP in the relational database has the same target table structure as the target database table TEST01;
 retrieve records of the mainframe data file from the associated mainframe computer system; and
 store the retrieved records of the mainframe data file in a workbench data file of the rehosting workbench in a data array that can be inserted into the empty temporary table TEST01_TMP in an insert operation, and wherein the uploading program operates to:
 upload the workbench data file to the empty temporary table TEST01_TMP having the same target table structure as the target database table TEST01 by inserting the retrieved records stored in the data array into the empty temporary table TEST01_TMP using the insert operation; and
 merge the records of the mainframe data file into the target database table TEST01 by invoking an existing embedded merge function within the relational database to merge the temporary table TEST01_TMP comprising the inserted retrieved records stored in the data array into the target database table TEST01.

8. The method of claim 7, wherein the uploading program is configured to upload the workbench data file in bulk.

9. The method of claim 7, wherein the uploading program is configured to:
partition the workbench data file into multiple segments; and
invoke a separate process or thread to upload each of the multiple segments to the temporary table TEST01_TMP.

10. The method of claim 7, wherein:
the plurality of scripts comprise SQL scripts and common business-oriented language (COBOL) programs;
the relational database is one of an Oracle relational database or DB2; and
the mainframe data file is a UNIX sequential file.

11. The method of claim 7, wherein the plurality of scripts are configured to upload the workbench data file to load the empty temporary table TEST01_TMP by inserting the data array into the temporary table TEST01_TMP in a single insert operation.

12. The method of claim 7, wherein the uploading program is configured to invoke an upsert operation of the internal merge function of the relational database to merge the temporary table TEST01_TMP comprising the data array to the target database table, wherein the upsert operation updates existing rows in the target database table or inserts new rows in the target database table based on a match condition.

13. A non-transitory computer readable storage medium, including instructions stored thereon which when read and executed by one or more computers cause the one or more computers to perform steps comprising:

executing a mainframe rehosting platform on a microprocessor, wherein the mainframe rehosting platform comprises the relational database, wherein the relational database comprises the target database table TEST01, wherein the target database TEST01 has a target table structure; and generating by a rehosting workbench an uploading program and a plurality of scripts based on the target database table TEST01 and the mainframe data file in the associated mainframe computer system, wherein the plurality of scripts operate to:

download the target table structure of the target database table TEST01 from the mainframe rehosting platform;

create an empty temporary table TEST01_TMP in the relational database, wherein the empty temporary table TEST01_TMP in the relational database has the target table structure as the target database table TEST01;

retrieve records of the mainframe data file from the associated mainframe computer system; and store the retrieved records of the mainframe data file in a workbench data file of the rehosting workbench in a data array that can be inserted into the empty temporary table TEST01_TMP in an insert operation, and wherein the uploading program operates to:

upload the workbench data file to the empty temporary table TEST01_TMP having the same target table structure as the target database table TEST01 by inserting the retrieved records stored in the data array into the empty temporary table TEST01_TMP using the insert operation; and merge the records of the mainframe data file into the target database table TEST01 by invoking and existing embedded merge function within the relational database to merge the temporary table TEST01 TMP comprising the inserted retrieved records stored in the data array into the target database table TEST01.

14. The non-transitory computer readable storage medium of claim 13, wherein the uploading program is configured to upload the workbench data file in bulk.

15. The non-transitory computer readable storage medium of claim 13, wherein the uploading program is configured to:

partition the workbench data file into multiple segments; and invoke a separate process or thread to upload each of the multiple segments to the temporary table TEST01_TMP.

16. The non-transitory computer readable storage medium of claim 13, wherein:

the plurality of scripts comprise SQL scripts and common business-oriented language (COBOL) programs;

the relational database is one of an Oracle relational database or DB2; and the data file is a UNIX sequential file.

17. The non-transitory computer readable storage medium of claim 13, wherein:

the plurality of scripts are configured to:

upload the workbench data file to load the empty temporary table TEST01_TMP by inserting the data array into the temporary table TEST01_TMP in a single insert operation; and the uploading program is configured to:

invoke an upsert operation of the internal merge function of the database to merge the temporary table TEST01_TMP comprising the data array to the target database table, wherein the upsert operation updates existing rows in the target database table or inserts new rows in the target database table based on a match condition.

* * * * *

UNITED STATES PATENT AND TRADEMARK OFFICE
CERTIFICATE OF CORRECTION

PATENT NO. : 10,691,712 B2
APPLICATION NO. : 15/386399
DATED : June 23, 2020
INVENTOR(S) : Zhang et al.

Page 1 of 1

It is certified that error appears in the above-identified patent and that said Letters Patent is hereby corrected as shown below:

On the Title Page

On second page, Column 2, under Other Publications, Line 18, delete "Moderationization," and insert -- Modernization, --, therefor.

In the Claims

In Column 12, Line 4, in Claim 13, delete "TEST01 TMP" and insert -- TEST01_TMP --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*